(12) United States Patent
Arrowood et al.

(10) Patent No.: US 10,482,145 B2
(45) Date of Patent: Nov. 19, 2019

(54) QUERY PROCESSING FOR ONLINE SOCIAL NETWORKS

(71) Applicant: Microsoft Technology Licensing, LLC, Redmond, WA (US)

(72) Inventors: Christopher Randall Arrowood, San Francisco, CA (US); Jesse Jyh-Cherng Hsia, Santa Clara, CA (US); Rachel Kumar, San Jose, CA (US); Chong Ho Lee, Cupertino, CA (US); Gaganpreet Singh Shah, Union City, CA (US); Sammy Shreibati, Menlo Park, CA (US); Vivian Mak Urata, San Francisco, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 367 days.

(21) Appl. No.: 15/447,903

(22) Filed: Mar. 2, 2017

(65) Prior Publication Data

US 2018/0253499 A1 Sep. 6, 2018

(51) Int. Cl.
*G06F 16/00* (2019.01)
*G06F 16/9535* (2019.01)
*H04L 29/08* (2006.01)
*G06Q 50/00* (2012.01)
*G06F 16/332* (2019.01)

(52) U.S. Cl.
CPC ...... *G06F 16/9535* (2019.01); *G06F 16/3329* (2019.01); *G06Q 50/01* (2013.01); *H04L 67/306* (2013.01)

(58) Field of Classification Search
CPC ............... G06Q 50/01; G06Q 30/0256; G06Q 30/0269; H04L 67/306; H04L 51/32; G06F 16/3329; G06F 16/9535; G06F 17/30654; G06F 17/30867; G06F 16/335; G06F 16/90324; G06F 16/24575; G06F 16/248; G06F 16/903
See application file for complete search history.

(56) References Cited

U.S. PATENT DOCUMENTS

| 8,423,392 B2* | 4/2013 | Moxley ................. G06Q 10/10 705/7.14 |
| 8,650,210 B1* | 2/2014 | Cheng ..................... G06F 3/167 707/770 |
| 8,832,132 B1* | 9/2014 | Spertus ................. H04L 67/306 707/765 |
| 8,935,192 B1* | 1/2015 | Ventilla .................... G06N 5/04 706/46 |
| 9,275,170 B2* | 3/2016 | Gross ..................... G06Q 30/02 |
| 9,489,458 B1* | 11/2016 | Haugen ................. G06F 16/951 |
| 2011/0208822 A1* | 8/2011 | Rathod ............... G06F 16/9535 709/206 |

(Continued)

*Primary Examiner* — Merilyn P Nguyen
(74) *Attorney, Agent, or Firm* — Schwegman Lundberg & Woessner, P.A.

(57) ABSTRACT

Among other things, embodiments of the present disclosure discussed herein may be used to receive, analyze, and distribute queries about various topics from a member of an online social network to other members of the social network. The embodiments of the present disclosure may additionally assess the quality of responses to queries by members, as well as expand or narrow the distribution of the query among the social network based on various events and criteria.

20 Claims, 7 Drawing Sheets

(56) References Cited

U.S. PATENT DOCUMENTS

| | | | |
|---|---|---|---|
| 2014/0019443 A1* | 1/2014 | Golshan | G06F 16/9535 707/723 |
| 2014/0129493 A1* | 5/2014 | Leopold | G06F 19/32 706/12 |
| 2014/0214960 A1* | 7/2014 | Allen | H04L 67/22 709/204 |
| 2014/0229866 A1* | 8/2014 | Gottlieb | H04L 65/403 715/758 |

* cited by examiner

QUERY PROCESSING FOR ONLINE SOCIAL NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

As the popularity of online, Internet-based social networks continues to grow, there is an increasing need for content hosts and providers (as well as others) to efficiently and effectively present the information contained in the profiles of social network users. Among other things, embodiments of the present disclosure help users of online social networks to submit queries to other members of the social network, and to process responses to such queries.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Among other things, embodiments of the present disclosure discussed herein may be used to receive, analyze, and distribute questions (also referred to herein as "queries") about various topics from a member of an online social network to other members of the social network. The embodiments of the present disclosure may additionally assess the quality of responses to queries by members, as well as expand or narrow the distribution of the query among the social network based on various events and criteria.

Figure 1:
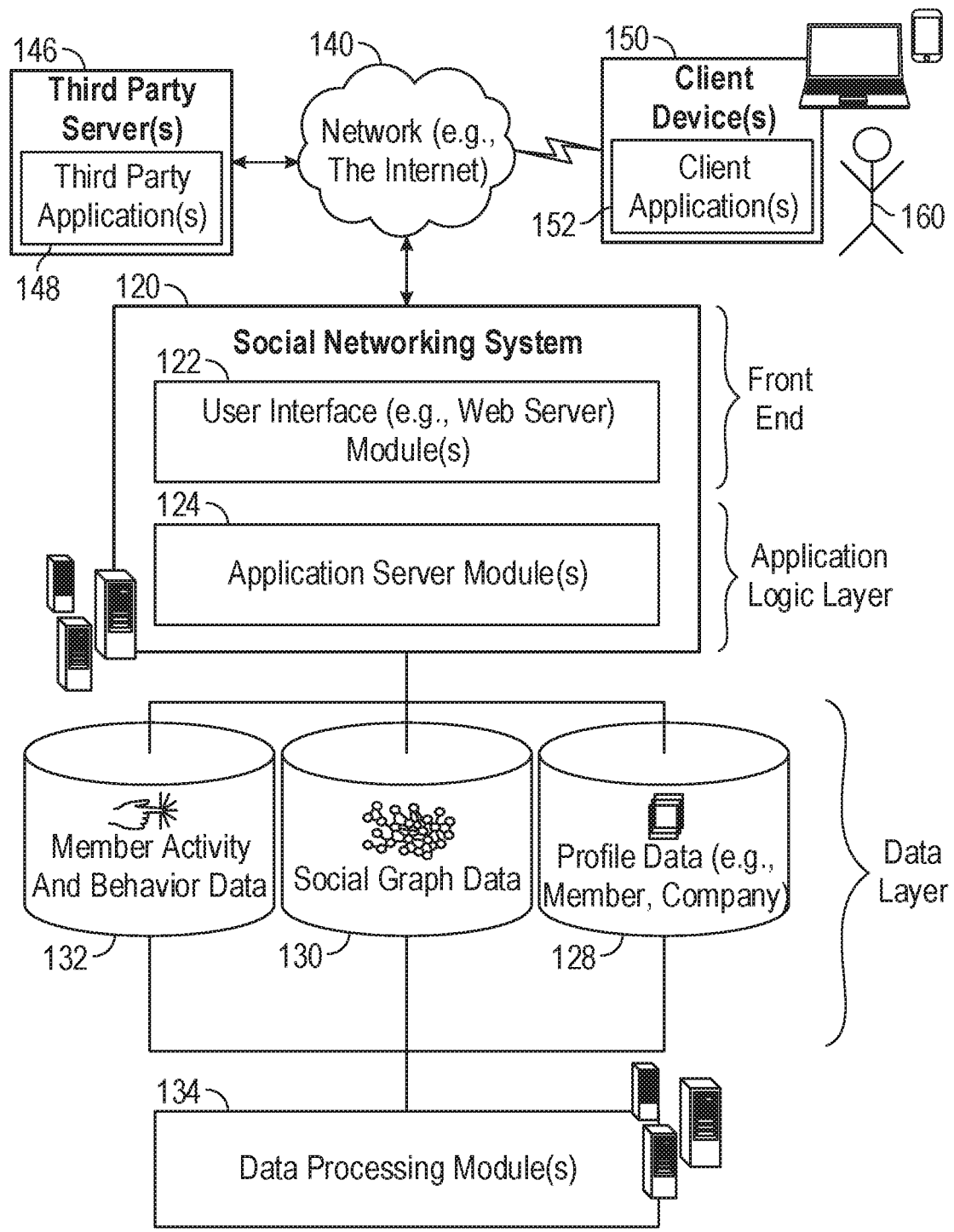
FIG. 1 is a block diagram illustrating a client-server system, according to various exemplary embodiments.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

An Internet-based social networking service is a web-based service that enables users (also referred to herein as "members") to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

Online social network platforms (also referred to herein as Internet-based social networks) provide a variety of information and content to users of the social network, such as articles on various topics, updates related to a user and individuals within the user's network, job opportunities, friend (or connection) suggestions, advertisements, news stories, and the like.

As shown in FIG. 1, the front end layer consists of a user interface module(s) (e.g., a web server) 122, which receives content requests from various computing devices including one or more user computing device(s) 150, and communicates appropriate responses to the requesting device. For example, the user interface module(s) 122 may receive requests in the form of Hypertext Transport Protocol (HTTP) requests, or other web-based, application programming interface (API) requests. The user device(s) 150 may be executing conventional web browser applications and/or applications (also referred to as "apps") that have been developed for a specific platform to include any of a wide variety of mobile computing devices and mobile-specific operating systems.

For example, user device(s) 150 may be executing user application(s) 152. The user application(s) 152 may provide functionality to present information to the user and communicate via the network 140 to exchange information with the social networking system 120. Each of the user devices 150 may comprise a computing device that includes at least a display and communication capabilities with the network 140 to access the social networking system 120. The user devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other entity interacting with the client device(s) 150. The user(s) 160 may interact with the social networking system 120 via the user device(s) 150. The user(s) 160 may not necessarily be part of the networked environment, but may be associated with user device(s) 150.

For example, the user 160 may, using the user's client device 150, submit a request for web page content (e.g., by entering or selecting a web page address via a web browser) hosted by a third party server 146 and/or social networking system 120. The server 146 and/or social networking system 120 may, in response to the request, cause web page content to display on a display screen coupled to the client device 150, and to classify the web content as described in more detail below.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. With various alternative embodiments, any number of other entities may be included in the social graph, and as such, various other databases may be used to store data corresponding to other entities. For example, the data layer may include one or more databases for storing webpage metadata.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2 and described in more detail below.

Additionally, a third party application(s) 148, executing on a third party server(s) 146, is shown as being communicatively coupled to the social networking system 120 and the user device(s) 150. The third party server(s) 146 may support one or more features or functions on a website hosted by the third party.

Figure 2:
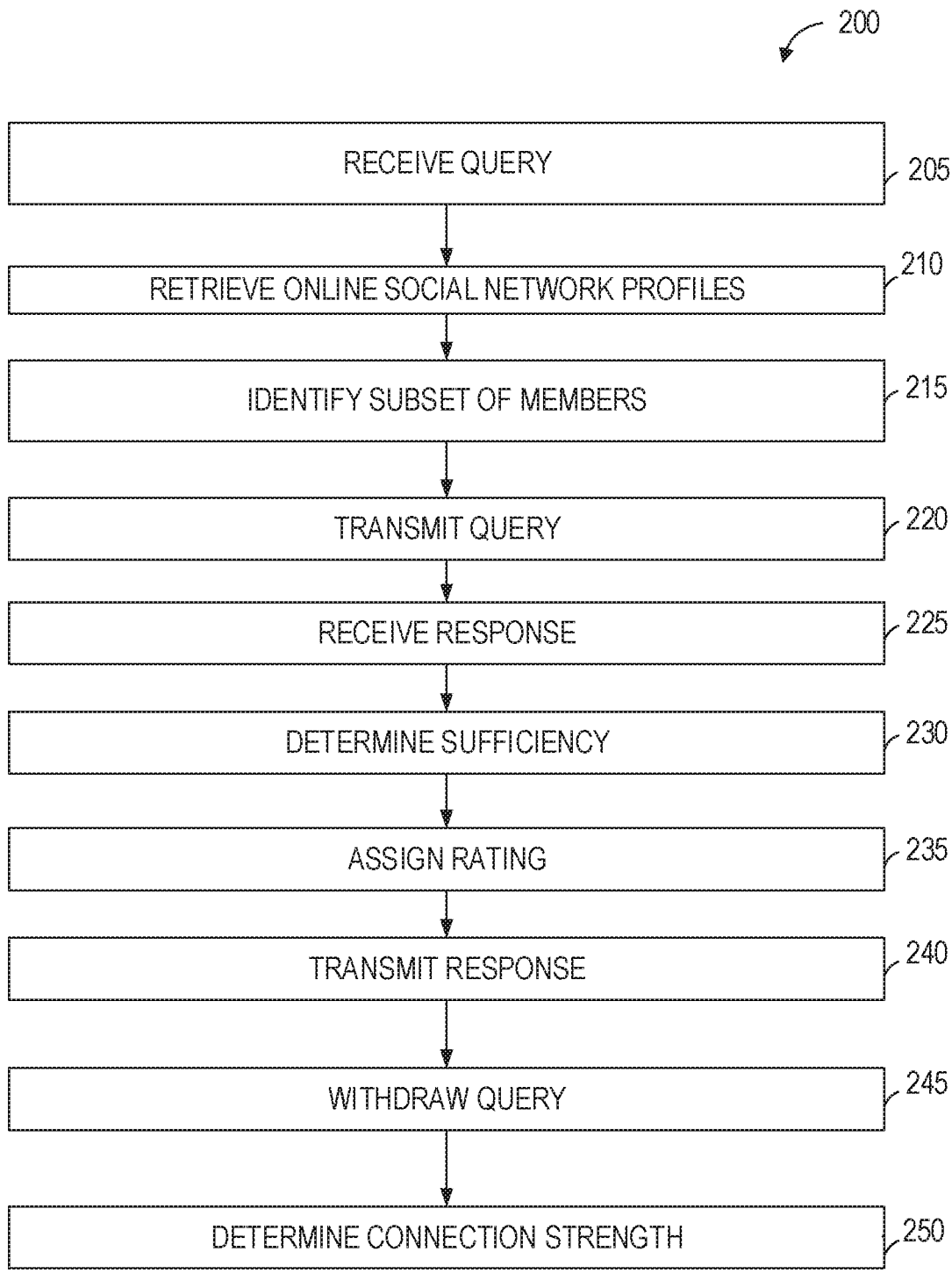
FIG. 2 is a flow diagram of a method according to various exemplary embodiments.

FIG. 2 illustrates an exemplary method 200 for classifying web page content according to various aspects of the present disclosure. Embodiments of the present disclosure may practice the steps of method 200 in whole or in part, and in conjunction with any other desired systems and methods. The functionality of method 200 may be performed, for example, using any combination of the systems depicted in FIGS. 1, 3, and/or 4.

In this example, method 200 includes receiving a query regarding a topic from a first member of an online social network (205), retrieving online social network profiles of a plurality of members (210), analyzing content in the online social network profiles to identify a subset of the members (215), transmitting the query to one or more members to be answered (220), receiving one or more responses to the query (225), determining the sufficiency of the response(s) (230), assigning a rating to a member of the online social network based on their answer to a query (235), transmitting a response to the querying member (240), withdrawing the query (245), and determining the strength of a connection between two members in the online social network based on a response to a query (250).

An online social network is a type of networked service provided by one or more computer systems accessible over a network that allows users/members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

As part of their member profiles, members may include information on their current position of employment. Information on their current position includes their title, company, geographic location, industry, and periods of employment. The social networking service may also track skills that members possess and when they learned those skills. Skills may be automatically determined by the social networking service based upon member profile attributes of the member, or may be manually entered by the member.

In many cases, a member of an online social network may have a question regarding a topic that the member might wish to pose to other members of the online social network, particularly members that the user has some connection with. However, the member may not wish to simply "blast" the query to everyone the member is connected to, particularly if the member has a large number of connections, different levels of familiarity between his/her connections, connections who have no expertise in the topic, connections who might be offended or alarmed by the question (e.g., co-workers of a member asking about new employment possibilities), and other concerns.

Additionally, a user of a social network may not be able to readily identify which of his/her connections would be best suited to answer the user's query, nor may the user have the time to research such information. Furthermore, sending the query to too few other members may result in the user not receiving any answer at all (e.g., the receiving members may not know the answer to the question or may not have the time or interest to respond), while sending the query to too many other members could result in receiving a flood of responses. Embodiments of the present disclosure address these and other issues.

Referring again to method 200 in FIG. 2, embodiments of the present disclosure may receive (205) any number of queries from any number of different sources and in any format. For example, a server computer system (e.g., hosting a social networking system 120 depicted in FIG. 1) may receive queries from one or more client computing devices 150 each associated with a respective user (e.g., member of the social network) over a network 140 such as the Internet, and the social networking system 120 may perform the steps of method 200 in whole or in combination with other systems and devices.

Figure 5B:
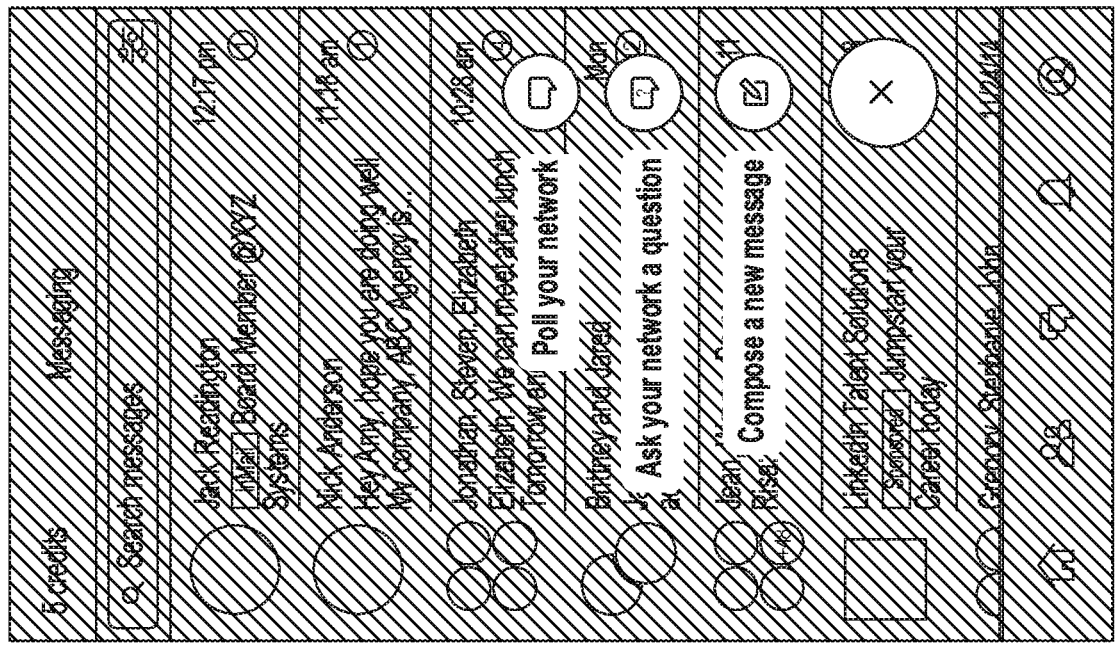
FIGS. 5A-5E are screenshots illustrating aspects of the method depicted in FIG. 2.
Figure 5A:
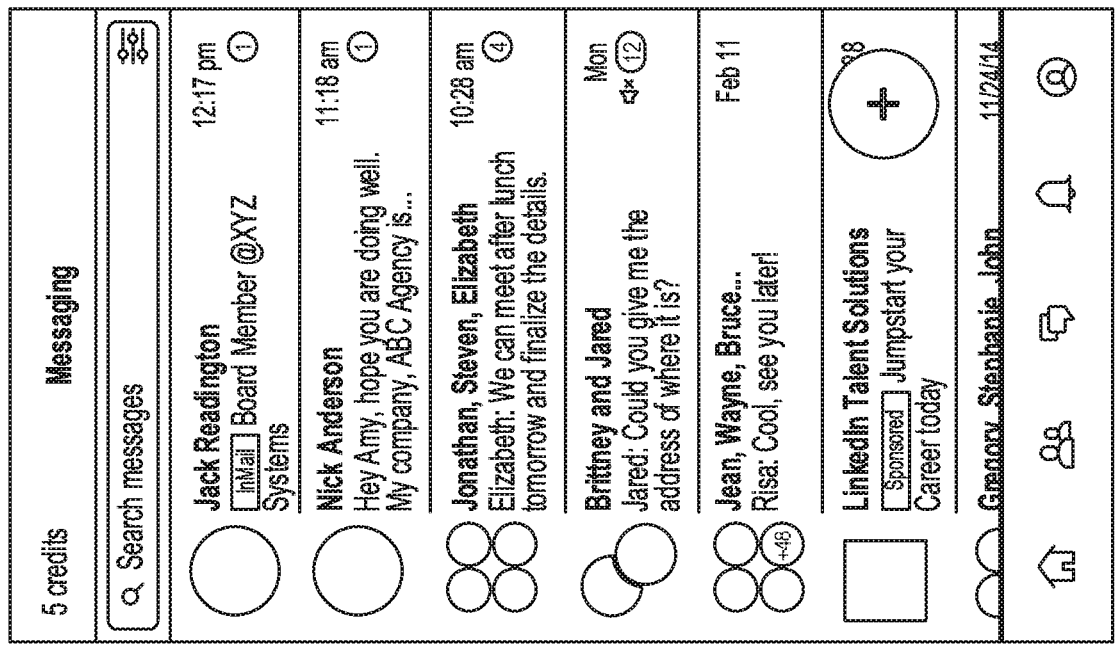

In some embodiments, the social networking system 120 may provide a web interface or other graphical user interface feature to allow users to submit queries. FIG. 5A, for example, depicts a screenshot of a list of messages involving a user of an online social network. In FIG. 5B, the user has selected an option (e.g., via the icons at the bottom of the screen in FIG. 5A) bringing up three options in a semi-transparent overlay over the list of messages, including an option to "ask your network a question." In this example, the user may select this option, enter a question about a topic, and the query is submitted to the social networking system via an electronic communication. In this context, an "electronic communication" received from, or transmitted to, the client computing devices of users of the online social network may include any amount and type of data transmitted in any suitable communications format, such as a data packet, email, text message, web interface entry, and others.

In response to receiving an electronic communication containing the query, the system may retrieve (210) profiles of members of the social network (e.g., from database 128 in FIG. 1) in order to analyze the profiles to identify a subset of members (215) to potentially transmit the query to. The system may retrieve member profiles and/or identify the subset of members analyzed based on a variety of criteria, such as being connected to the member submitting the query, the level of experience a member has in the topic of the query, and other factors.

In some embodiments, the subset of members is selected based on the level of strength of their connections to the member making the query. For example, the strength of a connection between a second member of the social network who is connected to a first member submitting a query may be determined based on the number of communications exchanged by the first and second member, the length of time the first and second member have been connected on the social network, the number of previous queries asked and/or answered by the first and second member, and other factors. Members having a relatively higher level of strength in their connections to the querying member may be included in the subset of members to potentially answer the query, while members having a relatively lower level of strength in their connections to the querying member may be excluded.

Members may be included in, or excluded from, the subset based on a variety of other criteria and/or events, such as one or more attributes determined from the profile of each respective member. For example, a member may be excluded from consideration to answer a query by a first member based on being employed at a same company as the first member, being a supervisor of the first member, being selected by the first member to not receive queries from the first member, a number of messages exchanged with first member being below a predetermined threshold, a number of outstanding queries from other members to the excluded member exceeding a predetermined threshold, an age of the excluded member's account on the online social network, and/or a job title of the excluded member. In the case of members who are coworkers or supervisors of a member asking a question, such members may be excluded based on the content of the query (e.g., the system may exclude such members from the subset for job-search related questions). Members could also be excluded for consideration where their profile indicates they do not have the requisite familiarity/experience with the topic being queried about.

Likewise, members may be included in the subset of members to potentially answer a query based on a variety of attributes from their profiles. For example, a member may be included in the subset based on a skill associated with the included member, a level of experience with the topic by the included member, a geographical location of the included member (e.g., within the same city or other geographical boundary as the first member), being a classmate or former classmate of the first member, being selected by the first member to receive queries from the first member, a number of messages exchanged with first member being above a predetermined threshold, a number of outstanding queries from other members to the included member being below a predetermined threshold, an age of the excluded member's account on the online social network, and a job title of the excluded member. Any of the criteria or events used to exclude one member from consideration to answer the query might also be used to include another member.

The system may include or exclude members based on a determination of each member's respective ability to answer a particular query. For example, the system may rank a member's ability to respond to the query accurately (as well as the timeliness in which the member is likely to respond) based on factors such as the member's experience in the topic of the query, the number of other queries the member that have been posed to the member (including those currently pending, those previously answered, and/or those that went unanswered), the frequency with which the user logs in to, or uses, the online social network, the speed with which the user responds to messages (such as queries), and other factors. The system may then select the top-ranked member or members to send the query to first to help increase the likelihood the querying member receives an accurate response within a reasonable timeframe (e.g., a timeframe for response submitted by the querying user). Lower-ranked members could then be sent the query if the higher-ranked members do not provide sufficient responses (e.g., inaccurate responses or do not respond in time).

The system transmits (220) the query (and potentially other information) to one or more members of the identified subset of members. In some embodiments, the query is transmitted via electronic communication over the Internet to the respective computing devices of each member selected to answer the query from the subset. In some embodiments, the system may initially transmit the query to only a single member and await a response from that member (225) to determine its sufficiency (230) before sending the query to additional members.

In other embodiments, the system may transmit (220) the query to a plurality of users. As noted above, the transmission of the query to other users of the online social network may be performed in a variety of ways, such as via email, text, or other messaging system. The query may also be transmitted to members within the messaging system of the social network itself. For example, the social network system 120 in FIG. 1 may display a notification to a member of the online social network hosted by the system 120 (e.g., via the display screen of the member's client computing device 150) alerting the user to the query.

The system may transmit (220) the query to multiple groups of members based on different events. For example, the system may transmit the query to a first plurality of members from the subset selected to potentially respond to the query, and wait for a predetermined time period for responses. In response to not receiving a response from any of the first plurality of members having a determined level of sufficiency (discussed below) that meets at least a predetermined threshold, the system may then transmit the query to another member (or a second plurality of members) to attempt to obtain a response for the querying user.

In some embodiments, the system can receive (205) a plurality of queries from one or more members, and distribute the queries among various other members (and not necessarily the same members) in a variety of different ways. For example, the system may receive a plurality of queries from a first member, transmit a subset of the plurality of queries to one or more members (e.g., in the subset of members selected to potentially respond to the query as discussed above), and does not transmit additional queries from the plurality of queries until one or more events or criteria is met, such as a response to a query from the initial subset of queries being received, a response being received that has a level of sufficiency that meets or exceeds a predetermined threshold, no response (or not enough responses) being received within a predetermined time period, and others.

The query may be transmitted along with a variety of other information. In some embodiments, for example, the communication may include links to the querying member's profile, links to information sources associated with the topic (e.g., to give context to the user's query), and other information. In some embodiments, the query may specifically exclude any identification information associated with the member posing the query, thus allowing users to ask questions anonymously.

In cases where queries are transmitted to multiple members, the manner of communication with one member may be different from the manner of communication used with another. For example, the system may deliver queries via the messaging software of the online social media network to users who frequently use the social network, but may send emails containing the query to other members who rarely log in to the social network. In this manner, the system helps ensure that the query reaches answering members using the manner of communication such members are most likely to use. The system can also send communications containing queries (or responses) to multiple computer systems and/or communication addresses for the same member to help ensure the member gets the query/response.

The system may receive a variety of different responses (225) to a query. For example, a member may provide an answer the question, indicate that the member will answer the question in the future, or indicate that the member does not agree to answer the question. The system may display to the requesting member (e.g., via the display screen of the member's computing device) a list of other members to whom the query was submitted, and the status of their responses (e.g., no response, answered, will answer later, declined to answer). Members may provide multiple responses to the same query. For example, a member may receive a query, indicate she will answer it later in a first response, provide an answer to part of the query in a second response, and provide an answer to the remainder of the query in a third response.

Based on the received response, the system determines a level of sufficiency (230) for the response in relation to the query. The level of sufficiency may be determined on any desired scale and based on a variety of criteria. For example, the level of sufficiency may be determined to be "sufficient" if a user provides an answer to the query, and "insufficient" if the user declines to answer or indicates the user will answer the query at a later time. In other embodiments, the system may determine the level of sufficiency on a numeric scale (e.g., 0-10), where a failure to respond, indication the user will respond later, or indication that the user will not respond may be assigned a 0. Additionally, the system may analyze (e.g., using text analysis algorithms) the content of the user's answer to the query and assign a score based on the content of the query and the content of the question.

Figure 5C:
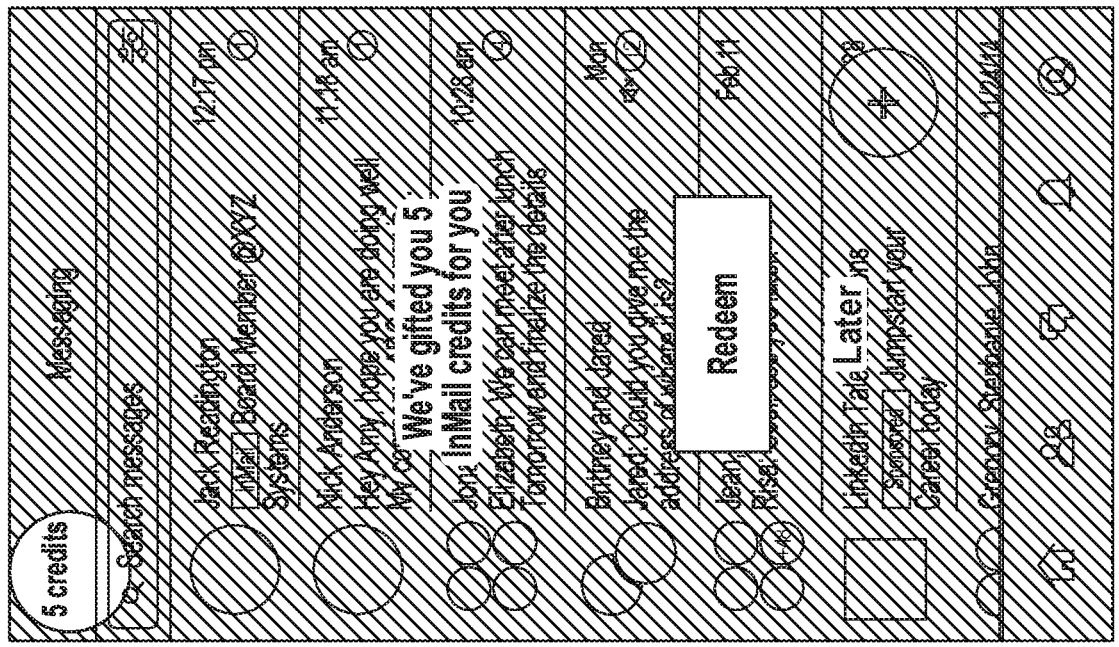

For example, FIG. 5C depicts a query (from "Christine") displayed on the screen of another user's mobile computing device. The query asks "Have you conducted a design sprint before? How do you ensure it's successful?" and the user is presented a button to "Answer" the query and transmit the user's response to the system. The system may analyze the response and assign a level of sufficiency to it based on accuracy, completeness, and other factors.

The system may transmit the response (240) to the requesting user as well as other users to whom the query was posed. In some embodiments, responses from users are transmitted (e.g., via electronic communications over the Internet) to the requesting user and/or other users responding to the query as they are received by the system. In other embodiments, responses from a responding user are only transmitted to other users in response to the level of sufficiency of the response meeting at least a predetermined threshold. For example, using the 1-10 scale described above, a response having a level of sufficiency under 5 may not be transmitted to other users, while responses having a level of sufficiency of 5 or above will be transmitted.

The level of sufficiency of a response may also be used to determine whether to take other actions by the system. For example, a first member of the social network may submit a query to the system that is transmitted to a second member to be answered. The second member provides a response to the system which is analyzed by the system to determine its level of sufficiency. In response to determining that the level of sufficiency of the response from the second member does not meet a least a predetermined threshold, the server may transmit (e.g., via an electronic communication over the Internet) the query to the computing device of a third user (e.g., selected from the subset of members described above) to answer the query. In this manner, the system can initially limit the number of users the query is sent out to, and gradually expand the number of members receiving the query based on insufficient responses from the members initially receiving the query.

Similarly, the third member may submit a response to the system and, in response to the third user's response having a level of sufficiency meeting or exceeding a predetermined threshold, transmitting an electronic communication containing the response from the third member to the computing device of the first (querying) member. The response could also be transmitted to the computing devices of other members to whom the query was transmitted to allow them to see the response.

Embodiments of the present disclosure may utilize the sufficiency level of a response to assign a rating (235) to a member providing the response. The rating may be on any desired scale. For example, a user may be given a relatively higher rating for a response having a relatively higher level of sufficiency, and a relatively lower rating for a response having a relatively lower level of sufficiency. The rating of a member may be used to, for example, select the subset of members to potentially answer a query in the future.

The system may withdraw a query (245) from one or more users to whom the query was previously transmitted. The system may, for example, disable the user's ability to respond to the query (e.g., by graying out the query on the user's screen, removing the query, etc.), remove the query from a list of communications received by the user, or otherwise prevent the user from responding to the query.

The system may withdraw a query (245) in response to a variety of different events and criteria. For example, the system may withdraw a query from a user in response to not receiving a response to the query from the user within a predetermined period of time.

The system may analyze queries by users and responses from users to such queries to determine various attributes and metrics, such as determining the strength of connections between a querying user and a user providing a response to the query. For example, a response from a second user declining to answer a query from a first user, declining more than a predetermined number of queries from the first user, failing to respond to one or more queries within a predetermined time period, and/or having responses with levels of sufficiency below a predetermined threshold, etc., may be used to determine a relatively weaker connection between the two users in the online social network. By contrast, a second user who responds to every query from a first user, responds within a predetermined time period, has levels of sufficiency meeting or exceeding predetermined thresholds, etc., may be determined to have a relatively stronger connection in the online social network to the first user.

Figure 5D:
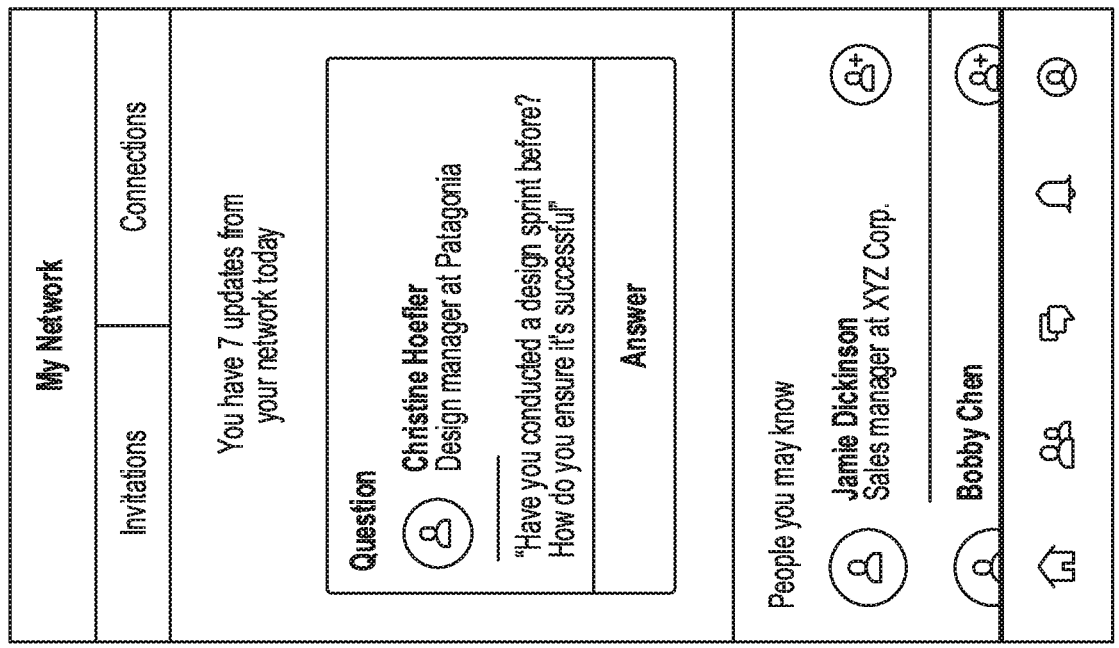
Figure 5E:
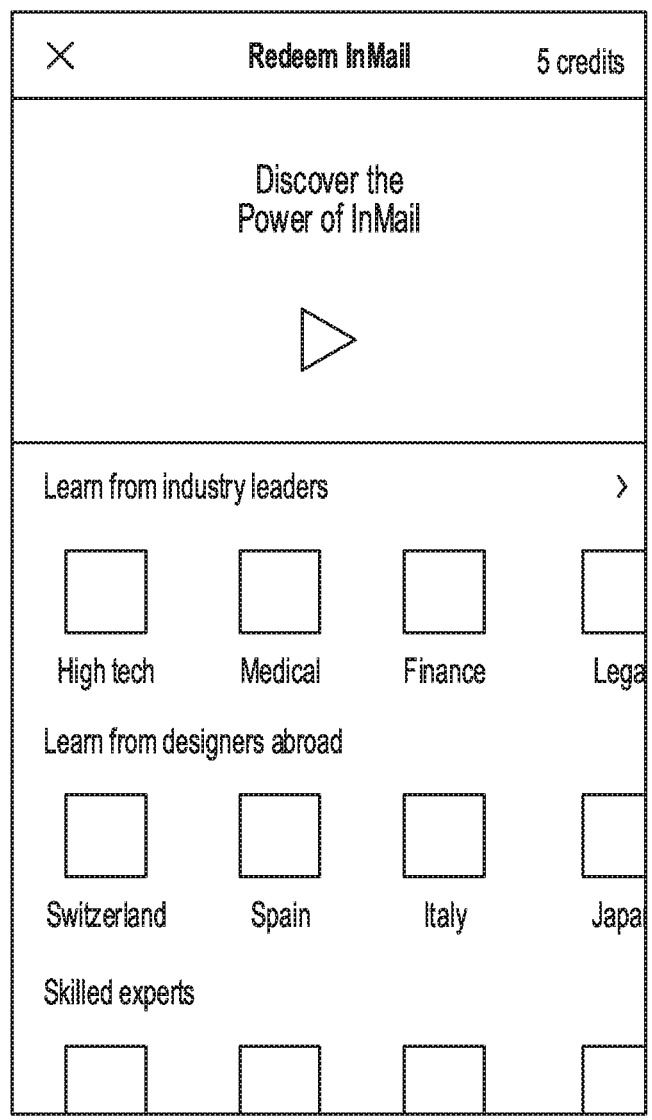

In some embodiments, users may be limited in the number of queries they can submit based on various criteria. For example, a user's queries could be limited based on the number of queries they respond to, the number of posts or articles they submit on the online social network, the age of their account on the online social network, and other criteria. In this manner, embodiments of the present disclosure can help prevent overuse of queries by certain members and can help to incentivize users to respond to queries. For example, FIG. 5D illustrates and example where "inmail credits" are issued to a user that the user can "spend" to receive answers to queries. FIG. 5E illustrates an example of a menu of different topics the user may select to ask a particular question.

Figure 3:
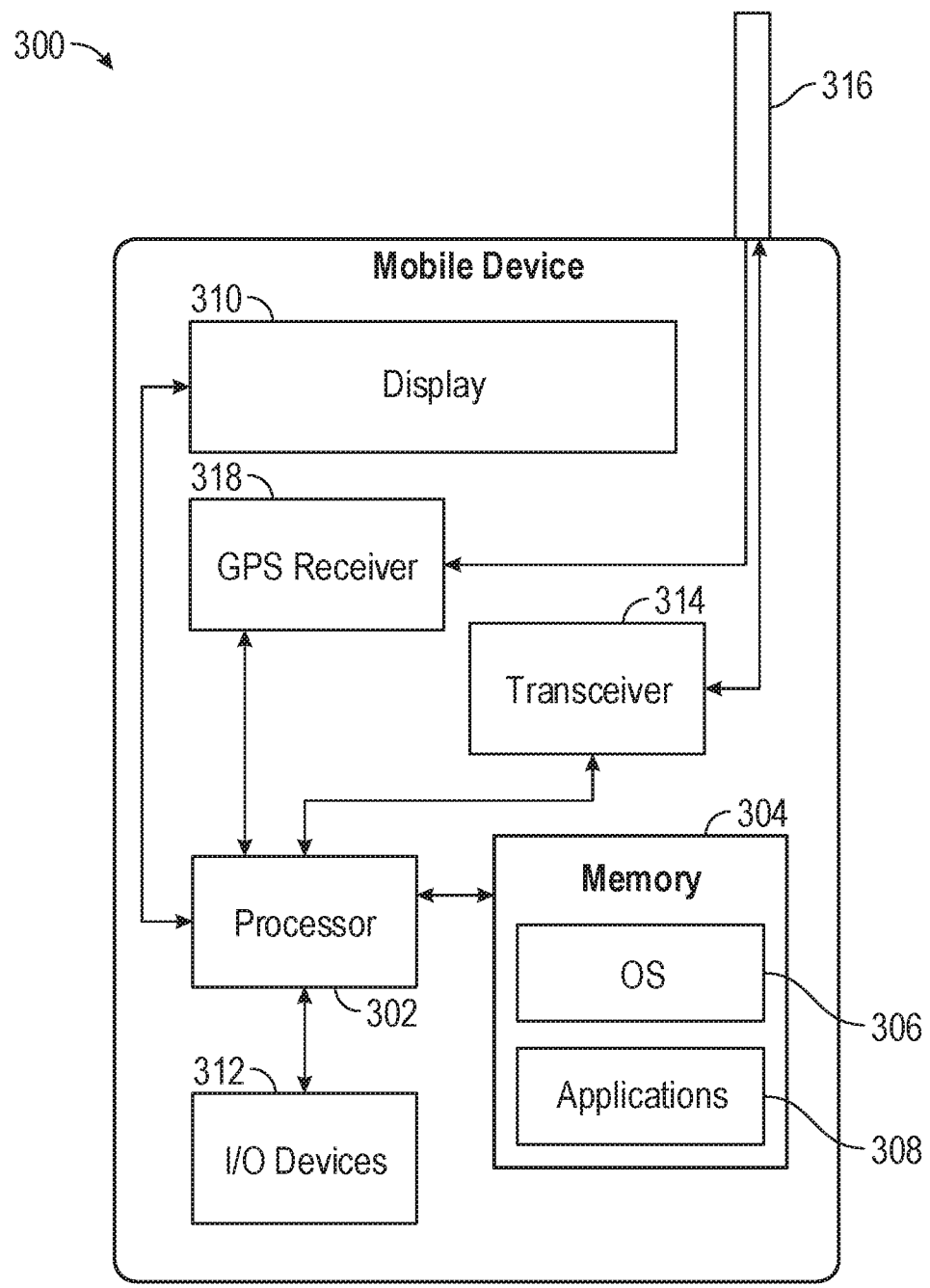
FIG. 3 is a block diagram illustrating an exemplary mobile device.

FIG. 3 is a block diagram illustrating a mobile device 300, according to an exemplary embodiment. The mobile device 300 may be (or include) a client device 150 (in FIG. 1) or any other device operating in conjunction with embodiments of the present disclosure. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
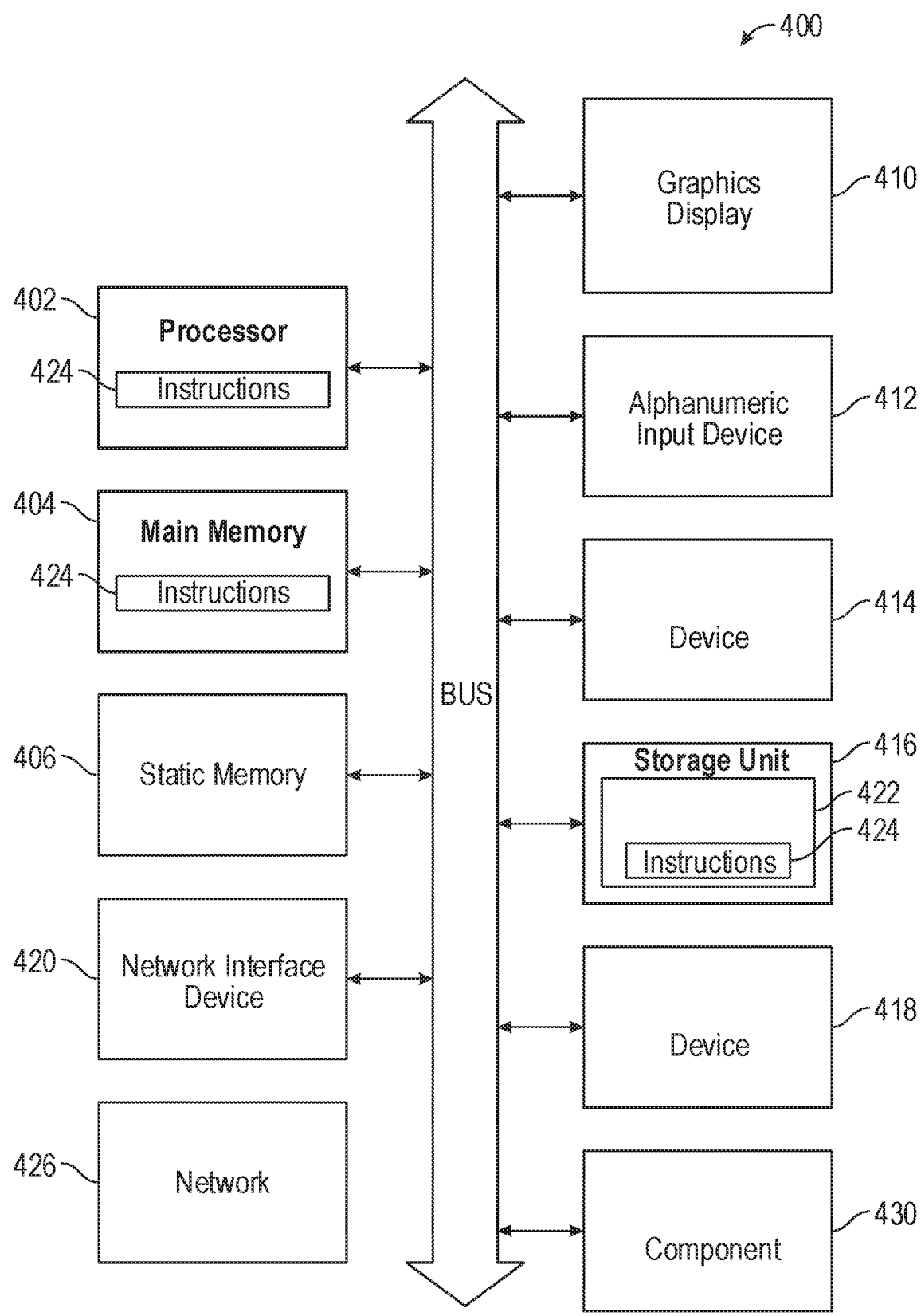
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:

1. A method comprising:
   receiving, by a server computer system from a first computing device of a first member of an online social network, an electronic communication transmitted over the Internet containing a query regarding a topic;
   retrieving, by the server computer system from a database, a plurality of profiles of a respective plurality of members of the online social network;

analyzing, by the server computer system, content of the retrieved profiles to identify a subset of members from the plurality of members of the online social network having a connection within the social network to the first member and experience with the topic;

transmitting, by the server computer system over the Internet, an electronic communication containing the query to a second computing device of a second member of the online social network from the subset of members;

receiving, by the server computer system over the Internet, an electronic communication containing a response to the query by the second member from the second computing device;

determining, by the server computer system, a level of sufficiency for the response to the query by the second member; and in response to determining that the level of sufficiency of the response to the query by the second member does not meet at least a predetermined threshold, transmitting, by the server computing device, an electronic communication containing the query to a third computing device of a third member of the online social network from the subset of members.

2. The method of claim 1, further comprising:

receiving, by the server computer system from the third computing device over the Internet, an electronic communication containing a response the query by the third member;

determining, by the server computer system, a level of sufficiency for the response to the query by the third member; and in response to determining that the level of sufficiency of the response to the query by the third member meets at least a predetermined threshold, transmitting an electronic communication over the Internet to the first computing device containing the response from the third member.

3. The method of claim 1, wherein the subset of members from the plurality of members of the online social network are identified based at least in part on a respective level of strength of their respective connections to the first member.

4. The method of claim 1, wherein identifying the subset of members from the plurality of members of the online social network includes excluding a respective member from, or including the respective member in, the subset of members based on one or more attributes determined from the profile for the respective member.

5. The method of claim 4, wherein a member from the plurality of members is excluded from the subset based on one or more of the following attributes determined from the excluded member's profile: being employed at a same company as the first member, being a supervisor of the first member, being selected by the first member to not receive queries from the first member, a number of messages exchanged with first member being below a predetermined threshold, a number of outstanding queries from other members to the excluded member exceeding a predetermined threshold, an age of the excluded member's account on the online social network, and a job title of the excluded member.

6. The method of claim 4, wherein a member from the plurality of members is included in the subset based on one or more of the following attributes determined from the included member's profile: a skill associated with the included member, a level of experience with the topic by the included member, a geographical location of the included member, being a classmate or former classmate of the first member, being selected by the first member to receive queries from the first member, a number of messages exchanged with first member being above a predetermined threshold, a number of outstanding queries from other members to the included member being below a predetermined threshold, an age of the excluded member's account on the online social network, and a job title of the excluded member.

7. The method of claim 1, further comprising transmitting the query to respective computing devices of a first plurality of members from the subset of members.

8. The method of claim 7, further comprising transmitting the query to respective computing devices of a second plurality of members from the subset of members in response to not receiving a response, within a predetermined time period, from any of the first plurality of members having a level of sufficiency that at least meets the predetermined threshold.

9. The method of claim 1, further comprising transmitting the query to a computing device of a fourth member from the plurality of members in response to not receiving a response, within a predetermined time period, from the third member that has a level of sufficiency that at least meets the predetermined threshold.

10. The method of claim 1, wherein the electronic communications containing the query do not contain any identification information associated with the first member.

11. The method of claim 1, wherein identifying the subset of members includes ranking an ability of each member in the subset of members to respond to the query.

12. The method of claim 1, wherein the server computer system transmits an electronic communication to the third computing device withdrawing the query in response to a response from the third member not being received within the predetermined period of time.

13. The method of claim 1, wherein the server computer system receives a plurality of queries from the first member, transmits a subset of the plurality of queries to one or more members in the subset of members, and does not transmit additional queries from the plurality of queries until a response to a query from the subset of queries is received by the server computer system.

14. The method of claim 1, wherein the response from the second member includes one or more of:

an answer to the question, an indication the second member agrees to answer the question in the future, or an indication the second member does not agree to answer the question.

15. The method of claim 1, further comprising determining a strength of a connection in the online social network between the first member and the second member based on the response from the second member.

16. The method of claim 1, further comprising:

receiving, by the server computer system from the third computing device over the Internet, an electronic communication containing a response the query by the third member;

determining, by the server computer system, a level of sufficiency for the response to the query by the third member; and assigning a rating to the third member based on the level of sufficiency for the response to the query by the third member.

17. The method of claim 16, further comprising:

in response to the rating of the third member meeting at least a predetermined threshold, transmitting an electronic communication containing a second query to the computing device of the third member.

18. The method of claim 1, further comprising:
receiving an electronic communication from the computing device of the first member containing an instruction to disable responses to the query; and
in response to the instruction to disable responses, transmitting an electronic communication to the computing device of the third member withdrawing the query.

19. A system comprising:
a processor; and
memory coupled to the processor and storing instructions that, when executed by the processor, cause the system to perform operations comprising:
receiving, from a first computing device of a first member of an online social network, an electronic communication transmitted over the Internet containing a query regarding a topic;
retrieving, from a database, a plurality of profiles of a respective plurality of members of the online social network;
analyzing content of the retrieved profiles to identify a subset of members from the plurality of members of the online social network having a connection within the social network to the first member and experience with the topic;
transmitting, over the Internet, an electronic communication containing the query to a second computing device of a second member of the online social network from the subset of members;
receiving, over the Internet, an electronic communication containing a response to the query by the second member from the second computing device;
determining a level of sufficiency for the response to the query by the second member; and
in response to determining that the level of sufficiency of the response to the query by the second member does not meet at least a predetermined threshold, transmitting an electronic communication containing the query to a third computing device of a third member of the online social network from the subset of members.

20. A tangible, non-transitory computer-readable medium storing instructions that, when executed by a server computer system, cause the server computer system to perform operations comprising:
receiving, from a first computing device of a first member of an online social network, an electronic communication transmitted over the Internet containing a query regarding a topic;
retrieving, from a database, a plurality of profiles of a respective plurality of members of the online social network;
analyzing content of the retrieved profiles to identify a subset of members from the plurality of members of the online social network having a connection within the social network to the first member and experience with the topic;
transmitting, over the Internet, an electronic communication containing the query to a second computing device of a second member of the online social network from the subset of members;
receiving, over the Internet, an electronic communication containing a response to the query by the second member from the second computing device;
determining a level of sufficiency for the response to the query by the second member; and
in response to determining that the level of sufficiency of the response to the query by the second member does not meet at least a predetermined threshold, transmitting an electronic communication containing the query to a third computing device of a third member of the online social network from the subset of members.

* * * * *